Nov. 26, 1946.  L. A. DE ROSA  2,411,714
ELECTRONIC ACCUMULATOR
Filed Sept. 26, 1941   3 Sheets-Sheet 1

Louis A. de Rosa
Inventor
By Earl Benst
His Attorney

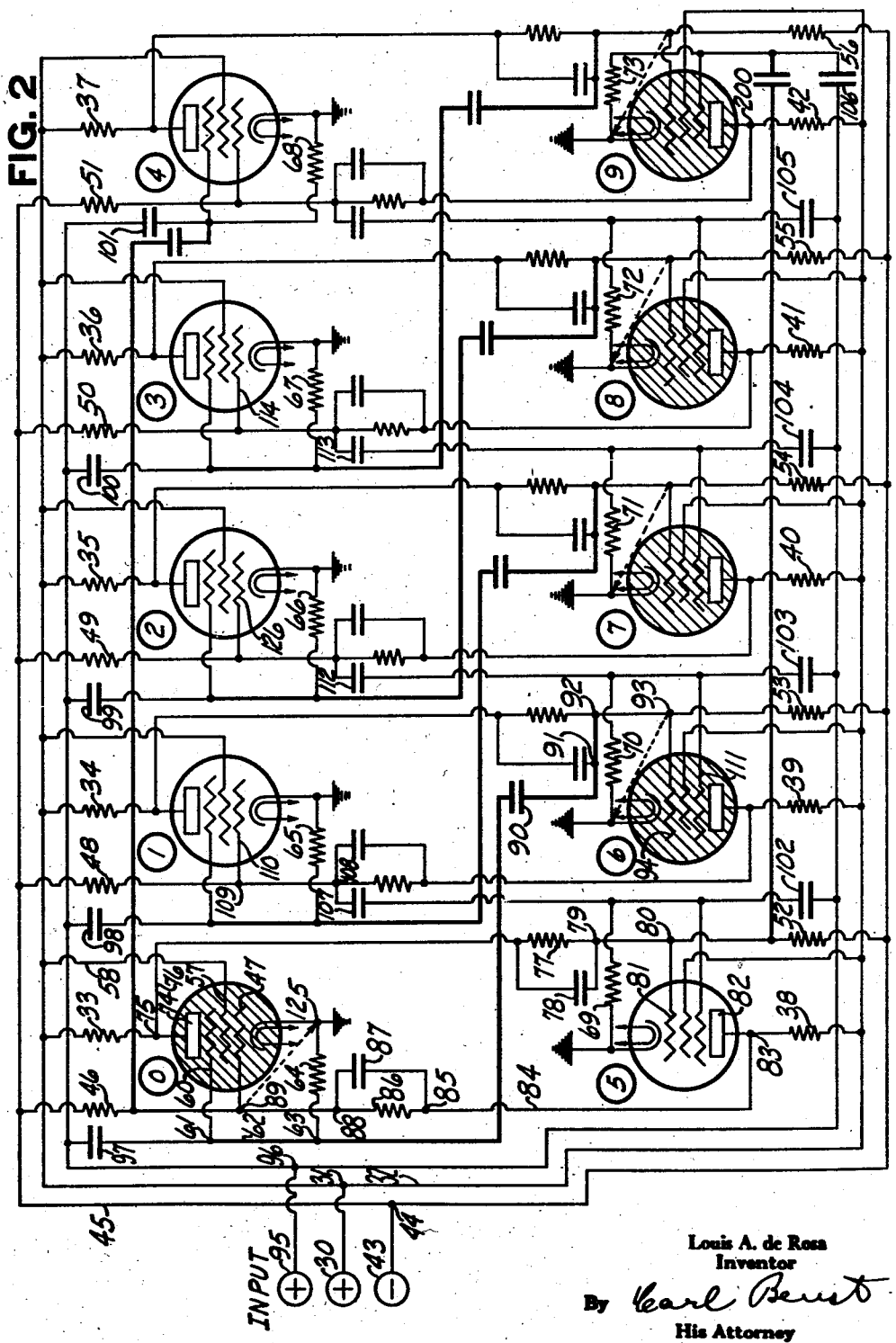

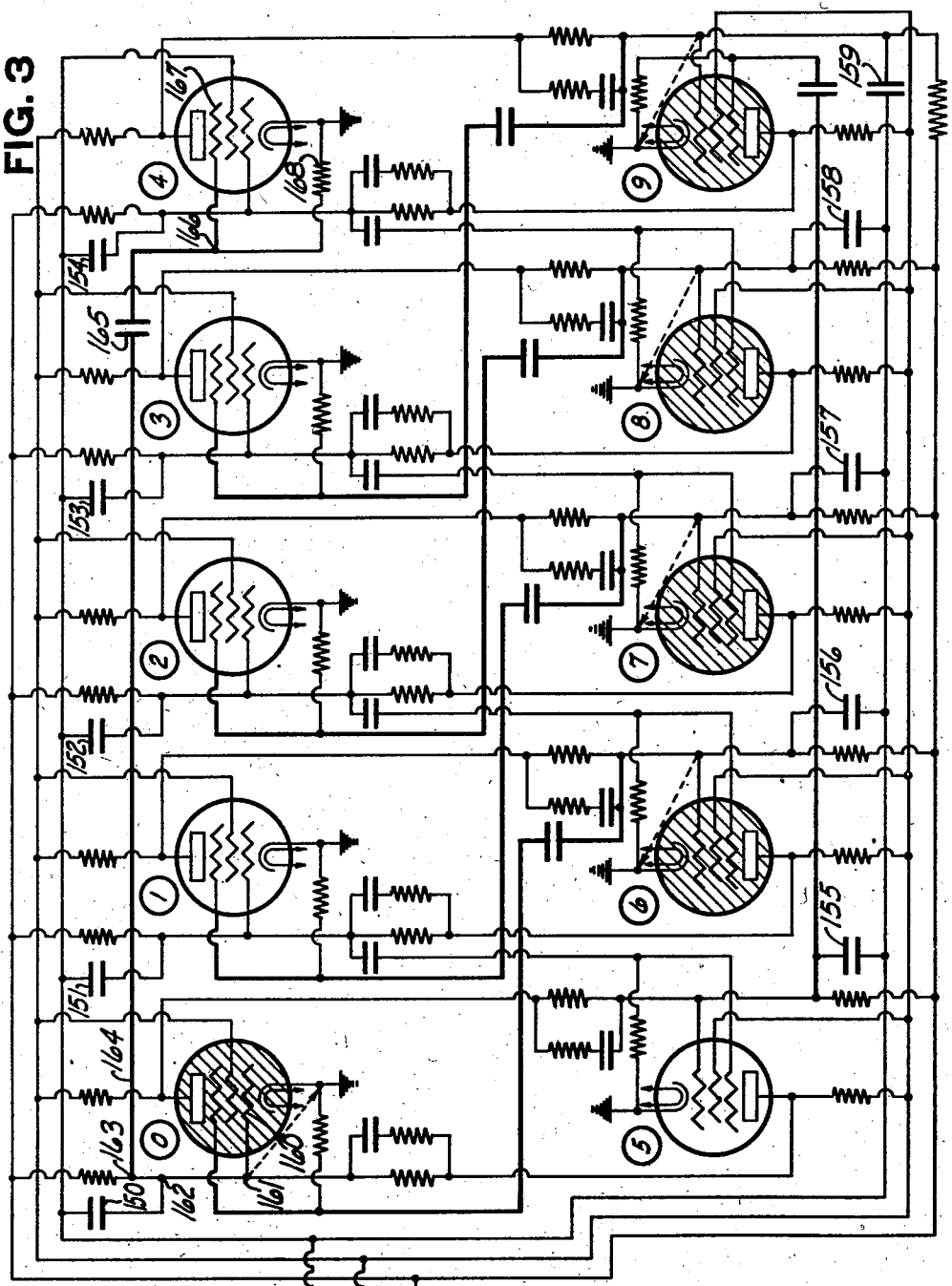

Patented Nov. 26, 1946

2,411,714

UNITED STATES PATENT OFFICE 2,411,714

ELECTRONIC ACCUMULATOR

Louis A. de Rosa, Dayton, Ohio, assignor to The National Cash Register Company, Dayton, Ohio, a corporation of Maryland Application September 26, 1941, Serial No. 412,519

15 Claims. (Cl. 250—27)

This invention relates to an electronic accumulator of data, responsive step by step to each of a plurality of electric impulses commonly impressed thereon at high frequency, and the invention more particularly relates to such an accumulator having an endless operating ring of high vacuum tubes, each of the tubes representing a unit of data.

Although the accumulator is adapted for receiving any intelligence which may be transmitted by units, by means of electrical impulses, the disclosed embodiment shows the accumulator adapted to receive data based on the decimal system of numerical notation. In the disclosed embodiment of the invention, there are shown ten high vacuum electron tubes connected in an endless operative chain whereby they are sequentially responsive step by step to each of a plurality of received electric impulses received at any intervals of time. It will be apparent that the invention may be used for receiving intelligence other than numerical data, as, for instance, alphabetical data, wherein an electron tube represents a letter which may be entered by impressing on the accumulator a certain number of impulses.

The disclosed embodiment of the invention includes ten high vacuum electron tubes, each representing a digit in a denominational order of the decimal system of numerical notation, so coupled in a network that the non-conducting condition of a tube will cause another determined tube in the network to be susceptible to the next commonly received electrical impulse, which next impulse will render said susceptible tube conducting, if not already in a conducting condition. In the embodiment shown, the couplings between the ten tubes have been so arranged that at a given instant five of the tubes are not conducting and five of the tubes are conducting. In addition to the coupling above noted, whereby the tubes are arranged in an endless chain, each tube is operatively paired with another tube in the chain by a trigger circuit so that either one tube or the other tube of such a pair of tubes is conducting at any given instant. At no instant are both tubes of such pairs of tubes fully non-conducting or conducting. The tube representing "0" is operatively paired in a trigger circuit with the tube representing "5." The tube representing "1" is operatively paired in a trigger circuit with the tube representing "6." The tube representing "2" is operatively paired in a trigger circuit with the tube representing "7." The tube representing "3" is operatively paired in a trigger circuit with the tube representing "8," and the tube representing "4" is operatively paired in a trigger circuit with the tube representing "9." Because the tubes so joined in trigger circuit pairs must have one mode of operation or another— that is, either one or the other of the tubes must be conducting at any given instant—it is apparent that but half of the tubes are conducting at any given instant and the other half are not conducting at the same instant. It is arranged by the circuit and couplings that the five conducting tubes at any given instant are adjacent in the numerical denominational order, and consequently the non-conducting tubes are adjacent in numerical order. It is further arranged that a conducting tube is caused to render another tube of the series non-susceptible to an impulse impressed thereon so as not to be responsive by becoming conducting on receipt of the next commonly received electric impulse. Couplings causing a conducting tube to render another tube non-susceptible to a received impulse are arranged in a pattern whereby four of the conducting tubes prevent a non-conducting tube from being responsive to the next commonly received electric potential impulse. It follows that only one of the non-conducting tubes will be responsive to the next commonly received potential impulse, with the result that only one tube changes from a non-conducting state to a conducting state on the next impulse. When such next tube becomes conducting, its paired tube in the trigger connection becomes non-conducting, as only one of the pair can be conducting at any given instant.

Therefore it is the principal object of this invention to provide a high-speed electronic accumulator of data comprising a plurality of digit-representing high vacuum electron tubes arranged in a network.

Another object of the invention is to provide a counting ring having as counting elements high vacuum electron tubes coupled in a network in pairs for alternate operation and coupled in other pairs for causing sequential operation.

Another object of the invention is to provide a novel accumulator of numerical data responsive to accumulate the numerical sum of electric impulses individually received at high speeds.

Another object of the invention is to provide a plurality of electron tubes connected in a network whereby the tubes are operated step by step by pairs in sequence, in response to each of one or more commonly received electric impulses.

Another object of the invention is to provide an endless operative chain of electron tubes wherein half the units comprising the chain are conducting at one time in adjacent order and wherein the adjacent operative tubes are caused to progress around the endless chain tube by tube.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

Of the drawings:

Fig. 2 is a circuit diagram for operatively connecting ten electron tubes constituting a decimal denominational order.

Fig. 3 shows a modified form of the circuit shown in Fig. 2.

*General description*

Figure 1:
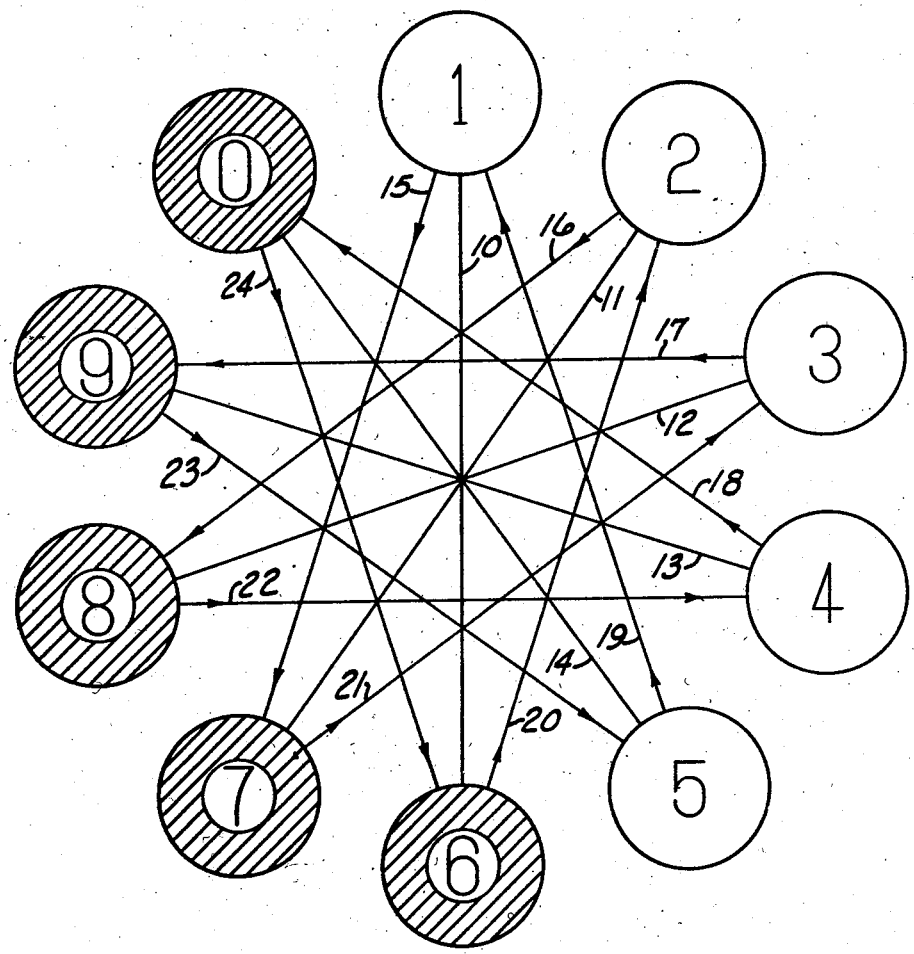
Fig. 1 is a diagrammatical showing of the operating, pairing, and causal relations between the electron tubes comprised in a denominational order of a numerical counting ring.

In Fig. 1, which is a functional diagram of the operation of the ten high vacuum electron tubes connected in a network, the circles represent the tubes, the numbers in the circles represent arbitrarily assigned digital values of the tubes in the decimal system, and the shading and non-shading of the circles indicate the conducting and non-conducting condition of a tube, respectively. The line 10 (Fig. 1) connecting the non-conducting "1" tube with the conducting "6" tube represents a trigger pairing of such tubes, one or the other of which tubes is always in a conducting condition and the other tube of the pair perforce being in a non-conducting condition. The remainder of the tubes are divided into pairs connected by trigger circuits as follows: tubes "2" and "7," indicated by line 11; tubes "3" and "8," indicated by line 12; tubes "4" and "9," indicated by line 13; and tubes "5" and "0," indicated by line 14. With the tubes in the condition shown in Fig. 1, the "6," "7," "8," "9," and "0" tubes are conducting. The conducting tube representing the sum of the accumulated data is to be considered for the purposes of this disclosure as the most clockwisely disposed of the conducting tubes, and, as shown in the diagram, such accumulation is represented as zero. It is to be noted that in the arrangement of the tubes given as an example, the most clockwisely positioned of the conducting tubes is chosen arbitrarily as representing the accumulated data, it being possible to choose any identifiable position for representing the accumulated data, as long as such choice is adhered to throughout the reception of the particular intelligence.

As has been stated before, each of the tubes in the network is coupled to one of the other tubes of the network so that, when it is conducting, it prevents said other tube from responding to an impressed impulse by becoming conducting if not already in a conducting condition, and said preventing action is caused by impressing a load upon the input impulse conductor to the tube in which conduction is to be prevented. The preventing action by a tube occurs only when it is conducting. It is arranged that, at any instant, only one of the non-conducting tubes is permitted to respond to an input impulse. Thus, as indicated by line 19, the non-conducting "5" tube is coupled to the "1" tube, but, inasmuch as the "5" tube is not conducting, the preventing action is not imposed on the "1" tube, which becomes responsive to the next impulse by becoming conducting. As indicated by lines 20, 21, 22, and 23, it is arranged that all the other non-conducting tubes are prevented from becoming conducting in response to said next impulse. The direction of the preventing action is indicated by the direction of the arrowhead on the connecting lines 15, 16, 17, 18, 19, 20, 21, 22, 23, and 24. Thus, with the accumulator registering a zero accumulation of data, it is found that, of all the non-conducting tubes, only the "1" tube is coupled to a non-conducting tube; i. e., the "1" tube is the only tube that can be responsive to the next impulse by becoming conducting. With the tubes in the condition shown in Fig. 1, an electric potential impulse commonly received by all the tubes causes the non-conducting "1" tube to become conducting, and such action of becoming conducting does, by the trigger connection, represented by line 10, cause the "6" tube to become non-conducting. Such trigger pairs of tubes, as heretofore stated, must be in one of two modes of operation; that is, either the one or the other of the tubes must be conducting at any given instant, and an act causing conduction in a theretofore non-conducting tube causes the other tube of the trigger pair to become non-conducting. Therefore, by the reception of an electrical potential impulse commonly impressed upon the ten tubes, they have changed from a condition representing "0" to a condition representing "1," as the then most clockwisely conducting tube is the "1" tube. Hence, the reception of one or more electrical impulses received in common by the ten tubes will cause the same number of steps of operation of the tubes, the tube last rendered conducting always representing, in the disclosed embodiment, the accumulation of data. The symmetrical pattern of the couplings between the tubes causes the tubes to be rendered conducting in sequence.

Circuits for connecting two vacuum tubes to operate as a trigger pair wherein, if one of the tubes of the pair is conducting, the other tube of the pair must be non-conducting, are well known. In such trigger-connected pairs of tubes, electric potential impulses are impressed commonly upon the control elements of the tubes, causing the mode of operation of the pair to be changed, and intermediate the reception of such impulses the mode of operation of the tube is rendered stable by direct current coupling the anode of each tube of the pair, which anode is supplied with a resistance in its supply conductor, to a control element of the other tube of the pair.

In the disclosed invention, each pair of trigger-connected tubes is stabilized in its mode of operation until the receipt of a positive electric potential impulse on the control element of the non-conducting tube, which causes the mode of operation of the pair to be reversed. For example, in the diagram of Fig. 2, on receipt of an electric potential impulse through point 96 and capacitor 102, tube "1" will become conducting, and tube "6," by reason of the trigger circuit connection, instantly becomes non-conducting.

The connection of a number of such described pairs of trigger-connected tubes in a network whereby such pairs are caused to operate as described so as to cause sequential operation of the tubes in an endless operating chain is novel.

The step-by-step sequential operation of the pairs of tubes as functionally described with reference to Fig. 1 is not to be deemed to limit the scope of the invention, as the number of pairs of tubes may be increased or decreased to suit the numerical notation desired or to suit any other form of data to be represented. Nor need the sequential operation of the pairs be based on their physical adjacence. The novelty in the invention resides not only in the particular circuit network but in the broad idea of the cooperation of a plurality of pairs of trigger-coupled tubes so joined as to form a counting ring responsive step by step to impulses of extremely high frequencies. Such an accounting ring representing a numerical denominational order is adaptable for use with other similar rings to form a plural denominational accumulator for numerical data. The condition of completion of a circuit of one ring gives rise to an electric impulse which causes one step of operation of another ring. It will be shown that connecting the anode of the "5" tube to the input conductor of the next ring will cause an input impulse in the next ring to advance the ring one step when the "5" tube is extinguished.

The electron tubes used in the disclosed embodiment of the invention are of the high vacuum type having three grid elements in addition to an anode and a cathode. The characteristics of low inter-electrode capacity, high transconductance, high suppressor grid conductance for positive voltages, and low plate control for the suppressor grid are desirable in the tubes used for this invention, as such characteristics are essential to high speed. A tube of the 6SJ7 type is particularly adapted for use in the disclosed embodiment, as the characteristics outlined are present in such type of tube. The usual suppressor grid is used for the purposes of this disclosure as an auxiliary anode and will be referred to hereinafter as an auxiliary grid or member. Any similar electron tube may be used, and the invention is not to be deemed limited by the particular type of electron tube mentioned.

The resistors, capacitors, and potentials used in the embodiment of the invention which will be described are relative, and changes in the type of tube and the speed desired or in the stability of operation desired may call for variation of these factors.

The circuit

Referring to Fig. 2, the tubes are numbered with the digits of the decimal denominational order from "0" to "9" inclusive.

The heater elements of the cathodes are shown conventionally, and each of the cathodes is grounded. Terminal 30, supplied with 180 volts positive potential, supplies anode potential to all the tubes through point 31 and conductor 32 common to all tubes. A 5,000-ohm resistor is included between conductor 32 and each anode, the resistor, for instance, for the anode of the "0" tube being numbered 33. The equivalent resistors for the anode supply of the "1," "2," "3," "4," "5," "6," "7," "8," and "9" tubes are numbered respectively 34, 35, 36, 37, 38, 39, 40, 41, and 42.

Terminal 43, supplied with 135 volts negative potential, furnishes a bias to the control grids of all the tubes through point 44 and conductor 45. Between said conductor 45 and each control grid is a resistor of 100,000 ohms, as, for instance, resistor 46 connecting the control grid 47 of the "0" tube to the conductor 45 through point 89. The corresponding resistors for the control grids of the tubes "1," "2," "3," "4," "5," "6," "7," "8," and "9" are numbered 48, 49, 50, 51, 52, 53, 54, 55, and 56 respectively.

The screen grids of all the tubes are connected to the anode potential supply conductor 32 directly, as, for instance, the screen grid 57 of the "0" tube is connected by conductor 58 directly to conductor 32. Each auxiliary grid is connected through a resistor of 50,000 ohms to ground; for instance, auxiliary grid 60 of the "0" tube is connected through point 61, conductor 62, point 63, and resistor 64 of 50,000 ohms to point 125, which is grounded. The other auxiliary grids are grounded in a like manner, grid resistors for the auxiliary grids of the "1," "2," "3," "4," "5," "6," "7," "8," and "9" tubes being numbered 65, 66, 67, 68, 69, 70, 71, 72, and 73 respectively.

The anode of each tube is conductively connected to the control grid of the tube paired with it in the trigger circuit. For instance (see Fig. 2), the "0" tube and the "5" tube are so connected, anode 74 of the "0" tube being connected through point 75, conductor 76, resistor 77 of 50,000 ohms in parallel with capacitor 78 of 25 micro-microfarads, point 79, and point 80 to the control grid 81 of the "5" tube. In a similar manner, the anode 82 of the "5" tube is connected through the point 83, conductor 84, point 85, resistor 86 of 50,000 ohms in parallel with capacitor 87 of 25 micro-microfarads, point 88, and point 89 to the control grid 47 of the "0" tube.

Each auxiliary grid is coupled electrostatically to the control grid of another tube, this coupling being represented for the auxiliary grid of the "0" tube in Fig. 1 by the line 27 connecting the "0" tube and the "6" tube. In Fig. 2, this same connection is as follows: from the auxiliary grid 60 of the "0" tube, through point 61, conductor 62, point 63, capacitor 90 of 25 micro-microfarads, point 91, point 92, and point 93 to the control grid 94 of the "6" tube.

Individual positive potential impulses impressed upon terminal 95 and through point 96 are impressed through capacitors 97, 98, 99, 100, 101, 102, 103, 104, 105, and 106, each of said capacitors being of 25 micro-microfarads. Assuming that the tubes of Fig. 2 are in the same condition as shown in the diagram of Fig. 1—that is, with the "0," "9," "8," "7," and "6" tubes conducting—which condition may be secured by temporarily grounding their control grids as indicated by the dotted arrows, then, upon a positive impulse being impressed through the capacitors 97 to 106 inclusive, only tube "1" will change from a nonconducting condition to a conducting condition, because, of all the non-conducting tubes, it is the only one that has its control grid coupled electrostatically to the auxiliary grid of a non-conducting tube. All the other non-conducting tubes—namely, "2," "3," "4," and "5"—have their control grids coupled electrostatically to the input conductor and to the auxiliary grid of an already conducting tube. Hence, when an impulse is impressed through capacitor 102 with the tubes conducting as described, the full energy of the impulse is impressed through capacitor 107, point 108, and point 109 to the control grid 110 of the "1" tube. The same impulse impressed through capacitor 103 is attenuated because of the conducting condition of the "6" tube, which conducting condition enables the auxiliary grid 111 to draw current when rendered more positive by the input impulse and thus to attenuate the impulse which is impressed through capacitor 112 onto the control grid 126 of the "2" tube. In a similar manner, the auxiliary grid of the "7" tube attenuates the impulse impressed through the capacitor 104 and capacitor 113 onto the grid 114 of the "3" tube. The same is true of the impulse impressed through capacitor 105 as the "8" tube is conducting. The same is true for the impulse impressed through capacitor 106, because the "9" tube is conducting. Therefore, it is seen that, when any tube is conducting, the ability of its auxiliary grid to attenuate the input impulse prevents the non-conducting tube to which the conducting tube's auxiliary grid is electrostatically connected from responding to an impulse by becoming conductive. It is also now apparent that only one tube is responsive at any one time to an input impulse, even though that impulse is impressed through all the capacitors 97 to 106 inclusive.

In the circuit of Fig. 2, input impulses of 50 volts positive potential are suitable. The ability of the auxiliary grid in a conducting tube to attenuate the input impulses is proportional to the conductance of the auxiliary grid of the tube. The potential bias on the control grid must be such that the control grid of a non-conducting tube will cause the tube to become conducting when impressed with an impulse that is not attenuated and grounded by conduction through the coupled auxiliary grid of another conducting tube.

Of course, when any tube is changed from a non-conducting condition to a conducting condition, its paired tube in the trigger circuit is rendered non-conducting, and therefore, just as the tubes individually are rendered conducting in sequence, the trigger-connected pairs of tubes themselves are operated in sequence. The arrangement of elements shown is essentially a plurality of trigger-connected pairs of high-vacuum electron tubes, which pairs are caused to change their mode of operation in sequence, over and over in an endless operating chain, one step at a time in response to each received electric impulse, together with means to route input impulses to the next tube that is to be rendered conducting.

A modified means for impressing impulses upon the plurality of tubes is shown in Fig. 3, and in that figure the impulses are impressed as in Fig. 2 through capacitors such as capacitors 150 to 159 inclusive. Capacitor 150 is directly connected to control grid 160 of the "0" tube through point 161, and point 161 is coupled through point 162, point 163, conductor 164, and capacitor 165 of 2,000 micro-microfarads to point 166, which point 166 is connected to the auxiliary grid 167 of the tube "4," said point 166 also being connected through the resistor 168 of 50,000 ohms to ground. It is therefore seen that the attenuating influence of auxiliary grid 167 on an input impulse is governed by the size of capacitor 165, and, in order to get sufficient attenuation, capacitor 165 must be large, and consequently time must be taken to discharge it between successive input impulses, necessitating lower frequency of the input impulses. Referring once again to Fig. 2, it is seen that the input impulse through capacitor 97 is not attenuated to any great extent by the capacity of capacitor 90, and therefore the circuit in Fig. 2 is capable of higher speed. The theory of operation in both forms as signified by Figs. 2 and 3 is to impose a load upon the input impulse to any non-conducting tube that is not to conduct in response thereto, and that load is caused by conduction in another tube by reason of the conductance of the auxiliary grid, which absorbs the energy of the input impulse that would otherwise be impressed upon the control grid of the connected tube.

It will be apparent that capacitor 150 of Fig. 3 corresponds to capacitor 101 of Fig. 2, as that is the input impulse path for the control grid of the "0" tube.

It will be understood that any plate of a tube which, having been conducting, is rendered non-conducting, will rise in potential as it becomes non-conducting, because of the resistor in its potential supply circuit; and such rise in potential can be taken advantage of to produce a positive impulse, which may be impressed upon the input conductor of another equivalent accumulator representing another denominational order to advance the accumulation of data in that other order by one step. Such transfer of carry-over data from denomination to denomination in a numerical accumulator by reason of a change in the potential of an electrode is shown and described in the application for United States Letters Patent, Serial No. 325,040, filed March 20, 1940, in the name of Joseph R. Desch and Robert E. Mumma. Point 83 (Fig. 2) at the anode of the "5" tube has about a 50-volt surge in a positive direction as that tube is rendered non-conducting, and therefore point 83 could be coupled to a terminal corresponding to input terminal 95 of a second denominational series. The anode potentials of the tubes may be scanned by a rotary switch to locate a conducting tube or tubes so as to control an indicator to show the accumulated data. The input impulse wave form should have a steep onset and an exponential decay. The potential surge at point 83 is sufficiently of that form to produce the desired operation. The input potential for the circuit of Fig. 3 should be of the same steep onset wave form as for the circuit of Fig. 2, but requires a wave form of only about 25 volts amplitude.

The speed of operation of the accumulator of Fig. 2 is about 150,000 steps per second, whereas that of Fig. 3 is considerably slower.

While the form of the invention herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:

1. In combination, a plurality of electron tubes each having a control grid; means coupling the tubes in a plurality of trigger pairs; and means coupling the different trigger pairs together so that they will be operated in sequence in response to each electric potential impulse commonly impressed on the control grids of all the tubes, one trigger pair responding to each impulse.

2. In combination, a plurality of high-vacuum electron tubes each having a control grid; means coupling the tubes in a plurality of trigger pairs; and means coupling the different trigger pairs together so that they will be operated in sequence in response to each electric potential impulse commonly impressed on the control grids of all the tubes, one trigger pair responding to each impulse.

3. A plurality of electron tubes each having a control element; and means connecting the tubes so that they may be serially rendered conducting by electric impulses commonly impressed on said control elements, said means including couplings interconnecting the tubes so as to cause the impressed impulses to be attenuated except as for one non-conducting tube predetermined by said connections and the conducting condition of the tubes so that the tubes are caused to become conducting in an endless chain succession.

4. A plurality of high-vacuum electron tubes each having a control element; and means connecting the tubes so that they may be serially rendered conducting by electric impulses commonly impressed on said control elements, said means including couplings interconnecting the tubes so as to cause the impressed impulses to be attenuated except as for one non-conducting tube predetermined by said connections and the conducting condition of the tubes so that the tubes are caused to become conductive in an endless chain succession.

5. A plurality of electron tubes; means coupling the tubes in trigger pairs so that one tube or the other tube of a pair is conducting at any given instant and so that an electric impulse commonly received by a pair changes the mode of operation; grid means common to all the tubes for impressing electric potential impulses thereon tending to trigger all the pairs; and means displaced relative to the trigger couplings of the tubes for coupling the trigger pairs in an endless operative chain whereby a commonly impressed electric potential impulse changes the mode of operation of one pair only of the plurality, the pair affected being selected in sequence by reason of the relative displacement in the sequence of the chain coupling and the trigger pairing and the mode of operation of the affecting pair.

6. A plurality of high-vacuum electron tubes; means coupling the tubes in trigger pairs so that one tube or the other tube is conducting at any given instant and so that an electric impulse commonly received by a pair changes the mode of operation; grid means common to all the tubes for impressing electric potential impulses thereon tending to trigger all the pairs; and means displaced relative to the trigger couplings of the tubes for coupling the trigger pairs in an endless operative chain whereby a commonly impressed electric potential impulse changes the mode of operation of one pair only of the plurality, the pair affected being selected in sequence by reason of the relative displacement of the chain coupling and the trigger pairing and the mode of operation of the affecting pair.

7. A plurality of tubes each including an anode, a cathode, a control grid, and an auxiliary grid; means coupling conductively the anode of one tube to the control grid of another tube forming trigger pairs so that but one tube of a pair can be conductive at any instant and so that electric potential impulses impressed upon the control grids of each of the pairs will change their mode of operation; means coupling the control grid of each tube to the auxiliary grid of a tube of another pair to form an endless operating chain of all the pairs of tubes; and means to impress electric impulses upon all the control grids simultaneously so that although half the tubes of the plurality are in non-conducting condition an input impulse common to all tubes will render but one of the non-conducting tubes conducting so as to change the mode of operation of its trigger pair, said affected tube being selectively predetermined by the auxiliary grid-control grid coupling pattern so that the tubes in the sequential series are rendered conductive one after another in an endless operative chain.

8. A plurality of electron tubes each having a cathode, an anode, a control grid, and an auxiliary grid; means for impressing electric potential impulses upon the control grids of all the tubes, tending to make them conduct; means coupling the auxiliary grid of one tube to the control grid of another tube in a pattern forming an endless chain sequence of such connections between the tubes whereby, if a tube be conducting, the grid current drawn by its auxiliary grid will attenuate the input impulse upon the control grid to which it is connected, preventing its effectiveness; and means for coupling the tubes in trigger pairs in a pattern for causing half the tubes to be in a conducting condition at any given instant, the pattern of the grid couplings being displaced from the pattern of the trigger couplings by one step of the sequence.

9. A plurality of high-vacuum tubes each including an anode, a cathode, a control grid, and an auxiliary grid; means conductively coupling the anode of one tube to the control grid of another tube, forming a trigger pair so that but one tube of the pair can be conducting at any instant and so that electric potential impulses impressed upon the control grids of both tubes of each of the pairs will change their mode of operation; means coupling the control grid of each tube to the auxiliary grid of a tube of another pair to form an endless operating chain of all the tubes; and means to impress electric impulses upon all the grids differentially so that although half the tubes of the plurality are in non-conducting condition an input impulse common to all tubes will render but one of the non-conducting tubes conducting so as to change the mode of operation of its trigger pair, said affected tube being selectively predetermined by the auxiliary grid-control grid coupling pattern so that the tubes in the sequential series are rendered conductive one after another.

10. The combination of a plurality of electron devices each including an anode, a cathode, a control grid, and an auxiliary grid member; means for supplying operating energy to the devices so that each may independently be in a conducting condition; means connecting the devices in trigger pairs whereby the condition of conduction in one tube of a pair causes the other tube of the pair to be in a non-conducting condition, which condition of a pair may be reversed by impressing the control grids of both devices of a pair with an electric potential impulse so that the non-conducting tube is rendered conducting and the paired tube is thereby rendered non-conducting; and means coupling the pairs in sequential series so that the pairs are caused to change their mode of operation one at a time in sequence in response to commonly applied electric potential impulses, said means including a coupling between the auxiliary grid member of a tube of one pair with the control grid of a tube of another pair so that when an input impulse is impressed commonly upon all the control grids, the coupling between a control grid and the auxiliary grid of the other tube, if the tube containing the auxiliary grid is conducting, so attenuates the input impulse for the control grid last mentioned as to render the impulse ineffective for that tube.

11. The combination of a plurality of high-vacuum electron devices each including an anode, a cathode, a control grid, and an auxiliary grid member; means for supplying operating energy to the devices so that each may independently be in a conducting condition; means connecting the devices in trigger pairs whereby the condition of conduction in one tube of a pair causes the other tube of the pair to be in a non-conducting condition, which condition of a pair may be reversed by impressing the control grids of both devices of a pair with an electric potential impulse so that the non-conducting tube is rendered conducting and the paired tube is thereby rendered non-conducting; and means coupling the pairs in sequential series so that the pairs are caused to change their mode of operation one at a time in sequence in response to commonly applied electric potential impulses, said means including a coupling between the auxiliary grid member of a tube of one pair with the control grid of a tube of another pair so that, when an input impulse is impressed commonly upon all the control grids, the coupling between a control grid and the auxiliary grid of the other tube, if the tube containing the auxiliary grid is conducting, so attenuates the input impulse for the control grid last mentioned as to render the impulse ineffective for that tube.

12. A plurality of electron tubes each having a cathode, an anode, a control grid, and an auxiliary grid; means for impressing positive electric potential impulses upon the control grids of all the tubes, tending to make them conducting; and means coupling the auxiliary grid of each tube to the control grid of another tube, forming an endless chain sequence of such connections between the tubes so that, if a tube be conducting, the grid current drawn by its auxiliary grid will attenuate the input impulse upon the control grid to which it is coupled, preventing the impulse from being effective on said last-mentioned control grid.

13. A plurality of high-vacuum electron tubes each having a cathode, an anode, a control grid, and an auxiliary grid; means for impressing positive electric potential impulses upon the control grids of all the tubes, tending to make them conducting; and means coupling the auxiliary grid of each tube to the control grid of another tube, forming an endless chain sequence of such connections between the tubes so that, if a tube be conducting, the grid current drawn by its auxiliary grid will attenuate the input impulse upon the control grid to which it is coupled, preventing said impulses from being effective on said last-mentioned control grid.

14. In combination, a plurality of electron tubes each having an impulse receiving control grid; means connecting the tubes in trigger pairs whereby at any instant but half of the tubes are conducting and the other half are non-conducting; means for supplying electric potential input impulses to the tubes, each of said impulses being applied to all the tubes and tending to change non-conducting tubes to become conducting; and couplings between other pairs of the tubes, one end of each of said couplings being the grid of a tube and the other being in the anode-cathode discharge of the other tube of the pair, so that the input impulse is attenuated in all but one of the non-conducting tubes by reason of conduction in other tubes, said tube on which the impulse is effective to cause conduction being sequentially selected automatically in endless chain manner due to the pattern of said couplings.

15. In combination, a plurality of high-vacuum electron tubes each having an impulse receiving control grid; means connecting the tubes in trigger pairs whereby at any instant but half of the tubes are conducting and the other half are non-conducting; means for supplying electric potential input impulses to the tubes, each of said impulses being applied to all the tubes and tending to change non-conducting tubes to become conducting; and couplings between other pairs of the tubes, one end of each of said couplings being the grid of a tube and the other being in the anode-cathode discharge of the other tube of the pair, so that the input impulse is attenuated in all but one of the non-conducting tubes by reason of conduction in other tubes, said tube on which the impulse is effective to cause conduction being sequentially selected automatically in endless chain manner due to the pattern of said couplings.

LOUIS A. DE ROSA.